SYNCHRONIZING APPARATUS

Filed Feb. 3, 1954 2 Sheets-Sheet 1

INVENTOR,
GUNTER K. GUTTWEIN.
BY
Harry M. Saragovitz
ATTORNEY.

INVENTOR,
GUNTER K. GUTTWEIN.
BY
Harry M. Saragovitz
ATTORNEY.

United States Patent Office 2,892,900

Patented June 30, 1959

2,892,900

SYNCHRONIZING APPARATUS

Gunter K. Guttwein, Long Branch, N.J., assignor to the United States of America as represented by the Secretary of the Army Application February 3, 1954, Serial No. 408,056

4 Claims. (Cl. 179—100.2)

(Granted under Title 35, U.S. Code (1952), sec. 266)

The invention described herein may be manufactured and used by or for the Government for governmental purposes without the payment of any royalty thereon.

The invention relates to synchronizing apparatus and particularly to such apparatus wherein the speed of mechanically operated recording and reproducing mechanisms are synchronized to an audio record transcribed upon a magnetic recording vehicle.

The invention has application to many systems wherein sound or other audio signals are to be recorded and reproduced in synchronism with the speed of operation of a coacting device. The principles of the invention will be presented herein in connection with the recording and reproduction of sound motion pictures. In this field the invention provides the improved sound quality which is obtained from the use of an electromagnetic recording vehicle and moreover the invention provides perfect synchronization between picture and sound. Furthermore by providing electromagnetic recording the conventional optically recorded and chemically developed sound track is removed from the film strip thus eliminating the limitations and disadvantages of the conventional system wherein the sound track is on the film strip.

The conventional commercial type of sound recording device using a magnetic tape is well adapted for use in the invention and it is in connection with such a device that a specific form of the invention will be described. In many of the commercial tape recorders a supersonic biasing signal is recorded upon the tape together with the sound recorder. In the conventional operation of such a device the supersonic signal is filtered out when the sound is played back. In the present invention the high frequency bias signal is given a double function. In addition to its conventional function it is also used as a vehicle from which to derive a pilot signal which in turn functions to control the speed of a driven device which in the specific application to be described is a motion picture projector.

A common source of power is used during the recording cycle of the apparatus both to drive the motion picture camera or other driven device and to provide a suitable basic frequency from which the supersonic bias frequency is derived.

Such a power source may conveniently be a commercial 60 cycle alternating current power line. The bias frequency and the sound are recorded upon the magnetic tape simultaneously and thus are given an inflexible time relationship. When the two signals are played back a pilot signal is derived from the bias signal which in turn is used to control the speed of the driven play-back device in synchronism with the sound signal. It will be obvious also that the play-back device and the sound signal will follow in proper time relation the operation of the recording devices.

The details of a system for utilizing the principles of the invention will be set forth hereinafter in connection with a description of a specific apparatus.

A primary object of the invention is to provide a system in which an audio signal may be perfectly synchronized with the function of mechanically driven recording and reproducing apparatus.

A further object of the invention is to provide a system for improving the quality of sound reproduction in sound motion picture systems.

A still further object of the invention is to apply the simplicity, convenience and economy of magnetic tape recorders to a sound motion picture system.

Another object of the invention is to provide an apparatus in which positive synchronization is achieved between a mechanically driven device and an audio signal through the medium of a pilot signal recorded upon a magnetic vehicle simultaneously with the audio signal.

Other objects and features of the invention will more fully appear from the following description and will be particularly pointed out in the claims.

To provide a better understanding of the invention a specific embodiment thereof will be described and illustrated in the accompanying drawings in which—

Figure 1:
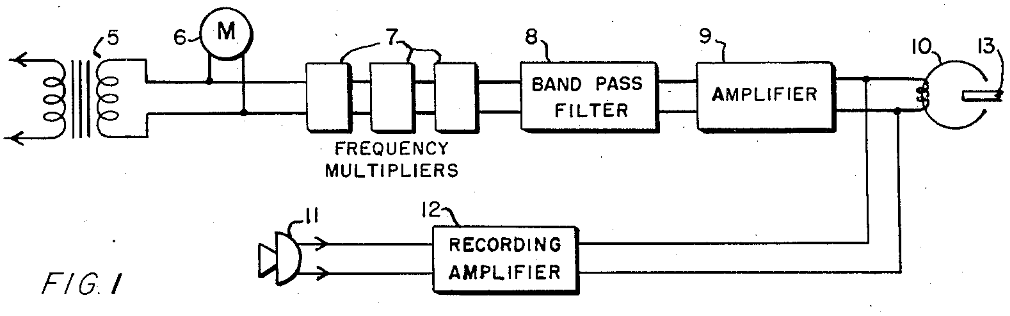
Fig. 1 illustrates diagrammatically a preferred form of the recording portion of the system.

The invention will be described in connection with its application to the synchronization of picture and sound in motion picture systems. Such application, however, is used by way of illustration only. The principles of the invention may be used in other ways as would occur to one skilled in the art.

The invention is well adapted to be powered by a commercial 60 cycle alternating current power supply line although any suitable low frequency alternating current source may be used. The recording portion of the apparatus shown in Fig. 1 employs a transformer 5 whose input is connected to a 60 cycle power line and its output to a synchronous motor 6 which in the particular embodiment chosen for illustration is the driving motor of a motion picture camera. The apparatus may, however, be constructed to function at line voltage in which case the transformer 5 may be eliminated.

As pointed out above, in many high quality tape recording devices a bias frequency above the audio range is recorded on the tape along with the sound record to obtain maximum quality of reproduction. The invention is adapted to supply this biasing frequency or to utilize the output of a bias frequency generator in a conventional tape recording apparatus as a vehicle from which a synchronizing pilot signal is derived. In the form of the invention illustrated in Fig. 1, however, the bias frequency is generated by a plurality of frequency multipliers 7 arranged in cascade to produce a supersonic output which is an integer multiple of the line frequency. A suitable bias frequency may be 48 kilocycles. The output of the frequency multiplier, desirably, is filtered in a band-pass filter unit 8, the output of which is fed to an amplifier 9 the output of which is in turn connected to the recording head 10 of a tape recording device. It is important to note that this bias frequency bears an inflexible relationship to the line frequency and therefore to the speed of the synchronous motor 6.

A microphone 11 records the coincident sound which is amplified in the amplifier 12 the output of which is fed to the recording head 10.

In the above manner the bias frequency and the sound are recorded simultaneously upon the tape 13 of the recording device through the medium of the recording head 10. Thus both signals have a fixed time relationship to the frame sequence of the motion picture recorded by the camera.

During the recording operation the tape may be driven by the existing speed controlled motor of the recording device. Since there is no additional load imposed upon this motor its speed will remain sufficiently constant to insure good sound quality. Obviously, the speed of this motor is not required to have positive synchronous relationship to the frame sequence of the motion picture.

Figure 2:
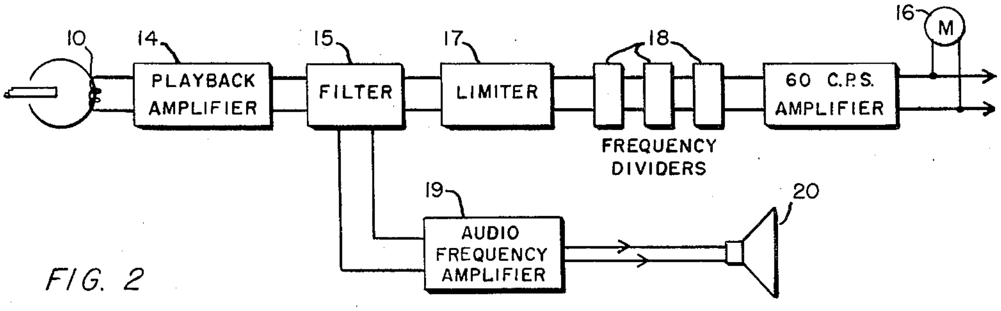
Fig. 2 illustrates diagrammatically the play-back portion of the system illustrated in Fig. 1.

Referring to the play-back portion of the system shown in Fig. 2. The output of the play-back head 10 is amplified in amplifier 14 whose output is fed to the filter net-network 15 which separates the bias frequency from the audio frequency. The bias frequency is fed through a series of elements which reduce its frequency to that of the power supply which in the present instant is 60 cycles.

The bias frequency may be reduced to the frequency of the pilot signal in any desired manner. As shown it is first passed through a limiter unit 17 wherein undesirable amplitude modulation is eliminated and it is then fed to a series of frequency dividers 18 which reduce its frequency to the desired 60 cycles. The pilot signal thus derived bears a fixed time relation to the power line frequency.

The pilot signal may then be power amplified and used directly to operate a synchronous motor 16 connected to the driven device of the system which in the embodiment described is a motion picture projector.

Alternatively the pilot signal may be fed to a motor control device of any desired type and this controlled motor may then be mechanically coupled to its load. The regulated motor may be connected to the driving member of a system of selsyn motors which in turn may drive a plurality of devices such as cameras or motion picture projectors.

The audio signal which has been separated from the bias signal is amplified in the usual manner by the amplifier 19 and is used to actuate a loud speaker.

Figure 3:
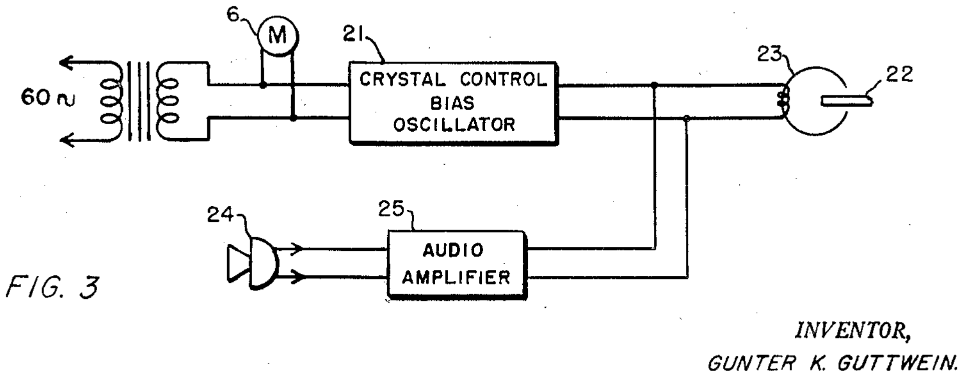
Fig. 3 illustrates diagrammatically a modified form of the recording portion of the system to be used in connection with the play-back system shown in Fig. 2.

The bias frequency may be created in various ways. A method which has been found to be satisfactory as an alternative method to that shown in Fig. 1 is shown diagrammatically in Fig. 3 wherein an oscillator 21 is used to generate the bias frequency. The output of this generator is closely regulated by a crystal and its output is applied to the tape 22 through the recording head 23. Preferably, the oscillator 21 is adjusted to function at a frequency which is an integer multiple of the line frequency, for example, its output may be 48 kilocycles. A microphone 24 picks up the coincidental sound which in turn is amplified in the amplifier 25 and fed to the recording head 23.

Simultaneously with the recording of the bias frequency and the sound signal the synchronous motor or other speed controlled motor 6 functions to drive the motion picture camera or other driven device. The motor may be powered from a 60 cycle power supply line.

To reproduce the recorded bias and sound signal it is played back in the apparatus shown in Fig. 2 where the bias frequency is separated from the sound and is in turn reduced to the 60 cycle line frequency to provide the necessary pilot signal which may be amplified and used to operate the motor 16 or may be used to control the speed of a nonsynchronous motor. The motor 16 is used to operate a motion picture projector or other driven device. The sound signal is amplified and fed to the loud speaker 20.

The invention also contemplates a further method and apparatus for utilizing the bias frequency of a magnetic tape recorder as a vehicle for the motor controlling pilot signal.

Figure 4:
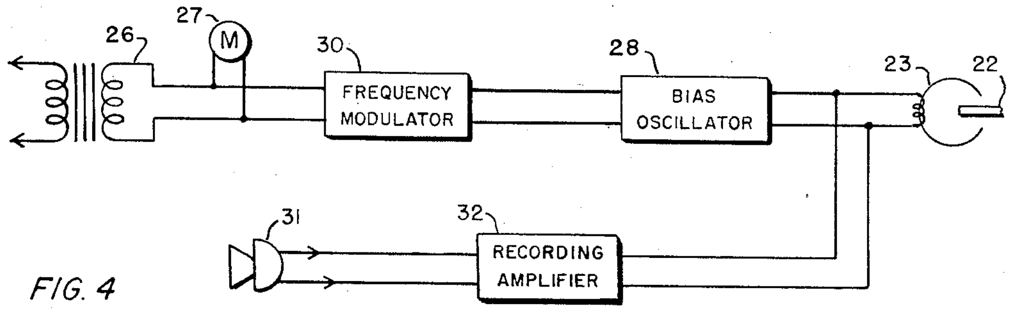
Fig. 4 illustrates diagrammatically a different form of the recording portion of the system.

Referring to Fig. 4 of the drawings a power line source supplies the energy for the system which is transformed, if necessary, in the transformer 26 to a siutable voltage. In this form of the invention the motor 27 of a motion picture camera, not shown, is driven from a low frequency power supply.

The oscillator 28 is employed to generate a frequency suitable for a bias frequency. The oscillator may be powered by any suitable source. Its output signal, however, is modulated by the same power line or other source that is used to operate the motor 27. The modulation of the bias signal is accomplished by a frequency modulating unit 30 and the frequency modulated output of the oscillator is then applied to the recording head 23 where it is recorded upon the tape 22. At the same time the coincidental sound is picked up by the microphone 21, amplified in the amplifier 32 and applied to the tape 22.

In this form of the invention the oscillator 28 need not be crystal controlled since the pilot signal recorded at line frequency upon the tape bears a fixed time relationship to the sound signal. The bias frequency functions only as a vehicle for the pilot frequency.

Figure 5:
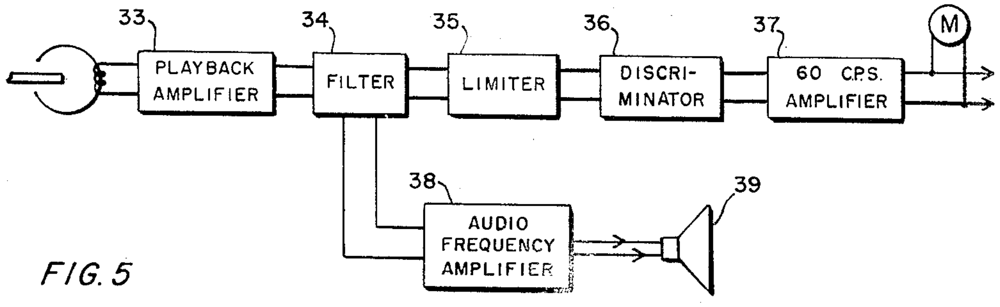
Fig. 5 illustrates diagrammatically the play-back portion of the system shown in Fig. 4.

The tape 22 is played back in an apparatus such as that shown in Fig. 5. The signal picked up by the playback head is fed to an amplifier 33 designed to pass both the bias and the sound signals. The bias and the sound signals are then separated in a filter unit 34. The bias frequency is then treated in a manner similar to a frequency modulated radio signal. It is first fed to a limiter circuit 34 and then to a discriminator 36 at the output of which a 60 cycle pilot signal emerges. The pilot signal is then amplified in the amplifier 37, the output of which is fed directly to a synchronous motor or the pilot signal may be used as above suggested to control a nonsynchronous motor.

The sound signal is independently fed to an audio amplifier 38 and thence to a loud speaker 39. Since the pilot signal and the sound have an inflexible time relationship a motion picture projector or other driven device may be operated in perfect synchronism with the reproduction of the recorded sound.

It should be noted in the above form of the invention that it is not possible to use an amplitude modulated system to modulate the bias frequency. The erratic nature of the bias signal as observed at the output of the filter 34 requires that an efficient limiter be used. This limiter, obviously, would destroy an amplitude modulated signal. By using the frequency modulated system as described a constant well formed sine wave is provided as a pilot signal.

By using the bias frequency as a vehicle for recording and play-back of synchronizing information, unwanted or undesirable components such as low or high frequency pilot tones are eliminated and, moreover, a phenomenon which is often found in magnetic recorders is efficiently utilized to good advantage in linking the tape recording device to a motion picture system or similar system.

While the invention has been described in connection with a sound motion picture system it has many other applications. For example, it may be used in devices wherein a driven member must be synchronized with recorded intelligence other than sound such as the output of a recording instrument wherein the flow of data is reproducible upon a magnetic tape.

Where the term "audio frequency" is used in the description and appended claims it is intended to refer to any frequency up to the limit of audibility whether pulsing or of sine wave form.

What is claimed is:

1. A synchronizing apparatus comprising a source of alternating current of low audio frequency, a first synchronous motor actuated from said source, means to increase the frequency of a component of the power source to a supersonic frequency which is an integer multiple of said source frequency, a magnetic recording device having a recording head and a magnetic recording vehicle, a microphone, connections acting to feed said supersonic frequency and the output of said microphone simultaneously to said recording head, playback means for said recording vehicle, a filter to separate the reproduced high frequency from the audio signal, means to reduce the high frequency to that of the power supply frequency thereby to obtain a pilot signal, means utilizing said pilot signal to control the speed of a second motor and sound reproducing means operated by the play-back audio signal.

2. A synchronizing apparatus comprising a synchronous motor driven motion picture camera, powered by a low audio frequency power supply, a magnetic sound recording device, means to convert a component of said power supply to supersonic frequency which is an integer multiple of said power line frequency, a microphone, connections to apply said supersonic frequency and the output of said microphone simultaneously to said magnetic recording device, means to play back both of the records from said recording device, a filter to separate the high from the audio frequency, frequency dividing means to reduce the high frequency to that of the supply line thereby to produce a pilot signal, means to amplify said signal, a motion picture projector having a synchronous motor powered by said amplified signal whereby the projector speed is synchronized with said camera and means to reproduce said audio signal.

3. A synchronizing apparatus comprising a first synchronous motor, a low frequency power supply therefor, frequency multiplier means to generate a supersonic frequency which is an integer multiple of the frequency of said power supply, a microphone, an electromagnetic recording device acting simultaneously to record said supersonic frequency and the output of said microphone, means to separate said high frequency from the said sound signals, means to reduce the said high frequency to the operating frequency of said first motor, means to amplify the reduced frequency, a second synchronous motor energized by the output of said amplifier and means to reproduce said audio signal.

4. A synchronizing apparatus comprising a first synchronous motor, a low frequency power source for operating said motor, a frequency multiplier acting to increase a component of said low frequency source to a supersonic frequency which is a harmonic of the low frequency, means for recording electric impulses including an electromagnetic recording head and a magnetic recording vehicle associated therewith, a microphone situated to pick up the sound impulses occurring during the recording period, connections from said microphone and said frequency multiplier to said recording head, means to reproduce the recorded signals, means to separate the high frequency signal from the sound signal, means to reduce the high frequency to the low frequency of the power source, a second synchronous motor, means to utilize the reduced frequency current to synchronize the speed of said second motor to that of the said first motor and means to reproduce the sound signals.

References Cited in the file of this patent

UNITED STATES PATENTS

| | | |
|---|---|---|
| 2,496,103 | Neufeld | Jan. 31, 1950 |
| 2,679,187 | Bitting | May 25, 1954 |
| 2,697,754 | Ranger | Dec. 21, 1954 |
| 2,727,097 | Frayne | Dec. 13, 1955 |
| 2,822,722 | Kennedy | Feb. 11, 1958 |

OTHER REFERENCES

Journal of the S.M.P.T.E., June 1951, vol. 56, No. 6, pages 653–671.